(12) United States Patent
Kaneo et al.

(10) Patent No.: US 6,484,119 B1
(45) Date of Patent: Nov. 19, 2002

(54) INPUT DEVICE HAVING DEFLECTION DETECTING ELEMENTS

(75) Inventors: Kazuo Kaneo, Miyagi-ken (JP); Toshio Ogawa, Miyagi-ken (JP); Katsuhiko Tochihara, Miyagi-ken (JP); Ryoichi Maeda, Miyagi-ken (JP); Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 6 days.

(21) Appl. No.: 09/861,228

(22) Filed: May 17, 2001

(30) Foreign Application Priority Data

May 22, 2000 (JP) ........................... 2000-154433
Jul. 10, 2000 (JP) ........................... 2000-213387

(51) Int. Cl.⁷ ........................... G01C 17/00; H01L 41/00
(52) U.S. Cl. ........................... 702/150; 702/94; 702/95; 310/364; 310/370
(58) Field of Search ........................... 702/33, 36, 41–43, 702/56, 94–95, 150–153; 310/363, 364, 365, 366, 370

(56) References Cited

U.S. PATENT DOCUMENTS

| | | | | |
|---|---|---|---|---|
| 4,086,815 A | * | 5/1978 | Asano et al. | 73/721 |
| 5,281,888 A | * | 1/1994 | Takeuchi et al. | 310/366 |
| 5,430,344 A | * | 7/1995 | Takeuchi et al. | 310/330 |
| 5,548,999 A | * | 8/1996 | Kakizaki et al. | 73/493 |
| 5,754,167 A | | 5/1998 | Narusawa et al. | |
| 5,867,808 A | | 2/1999 | Selker et al. | |

* cited by examiner

Primary Examiner—Bryan Bui
(74) Attorney, Agent, or Firm—Beyer Weaver & Thomas

(57) ABSTRACT

There is provided an input device which is small, has good productivity, is inexpensive, and can be surface-mounted. In an input device of the present invention, a plurality of terminals of a metal material connected to deflection detecting elements are connected in a substrate portion of an operation member, and the terminal allows the input device to be surface-mounted on a print board. It is thus possible to provide the input device which is inexpensive and small without using a conventional, large flexible substrate.

13 Claims, 6 Drawing Sheets

INPUT DEVICE HAVING DEFLECTION DETECTING ELEMENTS

BACKGROUND OF THE INVENTION

1. Filed of the Invention

The present invention relates to an input device for use in a computer or the like which employs deflection detecting elements and can be surface-mounted.

2. Description of the Prior Art

In a conventional input device using deflection detecting elements, as shown in FIG. 13, an operation member 51 of synthetic resin having flexibility is provided with a prism-shaped operation portion 51a, three planar base portions 51b, 51c and 51d extending radially from the lower portion of the operation portion 51a at a 90° angle to each other, and a joining portion 51e for joining three planar base portions 51b, 51c and 51d in the lower portion of the operation portion 51a. The operation member 51 is provided such that all the lower faces of the base portions 51b, 51c and 51d come into contact with and are mounted on a frame 50 of the keyboard for use in a computer and, in this state, the front end portions of the base portions 51b, 51c and 51d are pressed against the frame 50.

In the operation member 51, the operation portion 51a is tilted in the X1 or X2 direction, and in the Y1 or Y2 direction, so that the base portions 51b, 51c and 51d are deflected, respectively. The deflection amount is large or small according to an amount of the operation portion 51a tilted.

One face of a belt-like flexible substrate 52 made of polyester material is provided with two deflection detecting elements 53,54 consisting of a resistor and lead lines 55,56 connected to the deflection detecting elements 53,54 and formed by printing a conductive ink containing silver.

A part of the flexible substrate 52 has, adhered directly thereto by means of a bonding agent, the side not formed with the deflection detecting elements 53,54 on the top face of the base portions 51b,51c disposed at a 90° angle to each other. The deflection detecting element 53 on one hand is mounted on the base portion 51b, and the deflection detecting element 54 on the other hand is mounted on the base portion 51c.

In such an input device, the lead portions 55,56 formed on the belt-like flexible substrate 52 are connected by soldering to the print board of the keyboard (not shown). In the operation of the input device, when the operation portion 51a of the operation member 51 is tilted in the X1 direction, the top face of the base portion 51b is deflected in the extending direction, so that the deflection detecting element 53 disposed on the base portion 51b is extended to increase the resistance value. In addition, when the operation portion 51a is tilted in the X2 direction, the top face of the base portion 51b is deflected in the-shrinking direction, so that the deflection detecting element 53 disposed on the base portion 51b is shrunk to decrease the resistance value.

When the operation portion 51a is tilted in the Y1, direction, the resistance value of the deflection detecting element 54 is increased according to the principle as described, and when the operation portion 51a is tilted in the Y2 direction, the resistance value of the deflection detecting element 54 is decreased.

Fluctuations of the abovementioned resistance values are detected as fluctuations of the voltage values, and the fluctuations of the voltage values are read by the computer. Then, the computer controls the cursor so that the movement of the operation portion 51a in the X1 or X2 direction, and in the Y1 or Y2 direction may be a movement of the cursor in the upward or downward direction, and in the leftward or rightward direction.

Since the conventional input device uses the flexible substrate 52, the device is expensive and requires adhesion of the flexible substrate 52 onto the operation member 51, mounting of the operation member 51 on the frame 50, and soldering of the leads 55,56 to the print board. Thus, the number of assembling processes is increased, whereby the device has poor productivity and requires high cost.

Since the flexible substrate 52 is belt-shaped and larger than the outside shape of the base portions 51b, 51c and 51d, a large space is needed for mounting the flexible substrate 52 on the print board. Thus, the input device becomes large.

SUMMARY OF THE INVENTION

Accordingly, an object of the present invention is to provide an input device which is small, has good productivity, is inexpensive, and can be surface-mounted.

As a first solving means to solve the foregoing problems, an input device having deflection detecting elements has an operation member having a planar substrate portion and an operation portion provided in the substantially center of the substrate portion, a plurality of deflection detecting elements provided on the lower face of the substrate portion, and a plurality of terminal portions consisting of a plurality of electrode portions connected electrically to the deflection detecting elements on the lower face of the substrate portion, and a plurality of terminals in contact with the electrode portions, wherein the plurality of terminals allow the input device to be surface-mounted on land portions of a print board.

As a second solving means, four of the deflection detecting elements are disposed at a 90° angle to each other with respect to the operation portion as its center.

As a third solving means, the portion with the terminal surface-mounted thereon protrudes downwardly from the lower face of the substrate portion, the terminal holding the lower face of the substrate portion so as to be spaced from the print board.

As a fourth solving means, the terminal portion is formed between the adjacent deflection detecting elements.

As a fifth solving means, a beam portion is formed in the substrate portion by providing a hole in the position surrounded by the adjacent deflection detecting elements and the terminal portion, the beam portion being provided with the deflection detecting element.

As a sixth solving means, the terminal is held onto the substrate portion so that a part of the terminal is embedded therein.

As a seventh solving means, the input device further has a flexible substrate provided at one face side with the deflection element and the electrode portion, the flexible substrate having the other face side adhered onto the lower face of the operation member.

As an eighth solving means, the flexible substrate is made smaller than the outside shape of the operation member.

As a ninth solving means, the terminal is a U-shaped clip, the clip gripping the operation member and the flexible substrate, and the clip having its lower piece portion arranged on the print board.

As a tenth solving means, the lower piece portion of the clip is provided with a hole in the position in which the electrode portion and the land portion are opposite to each other.

As an eleventh solving means, the lower piece portion of the clip is provided with a convex portion in the position in which the electrode portion and the land portion are opposite to each other.

As a twelfth solving means, the top portion of the convex portion comes into contact with the electrode portion.

As a thirteenth solving means, the operation member has linear portions formed by cutting off the parts thereof in the positions opposite to each other with respect to the center of the operation portion in the outer circumference portion positioned between the deflection detecting elements, the clip being arranged in the position of the linear portion.

PREFERRED EMBODIMENTS OF THE INVENTION

Figure 1:
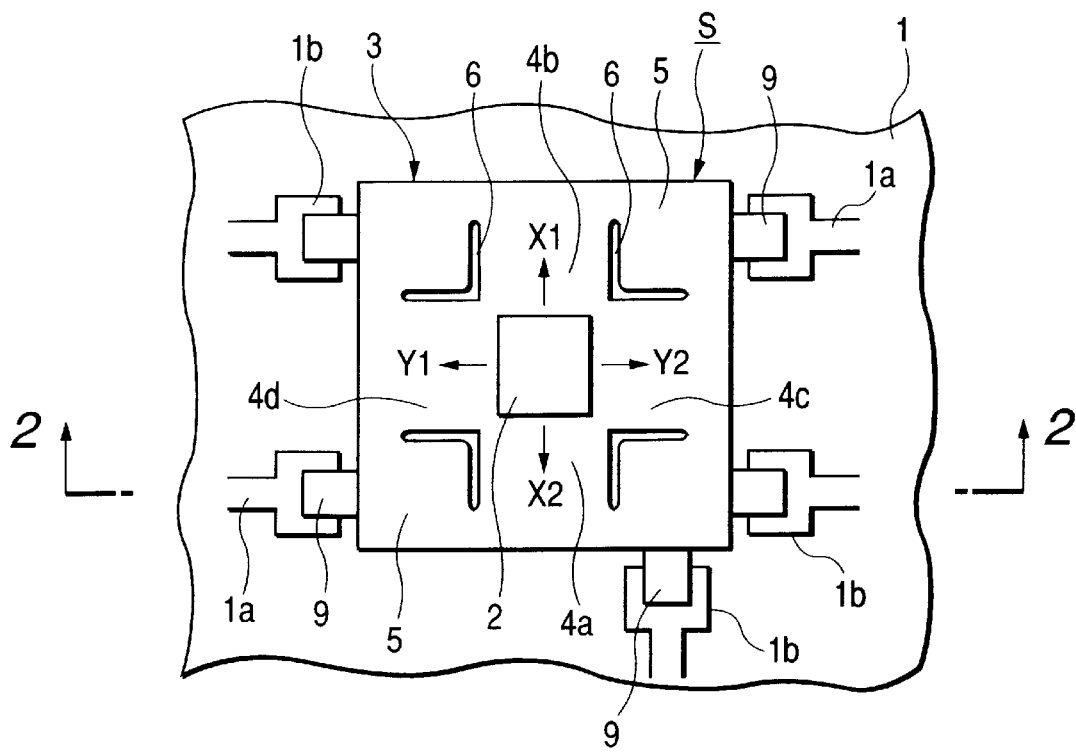
FIG. 1 is a plan view showing a state where an input device of a first embodiment of the present invention is mounted on a print circuit.
Figure 2:
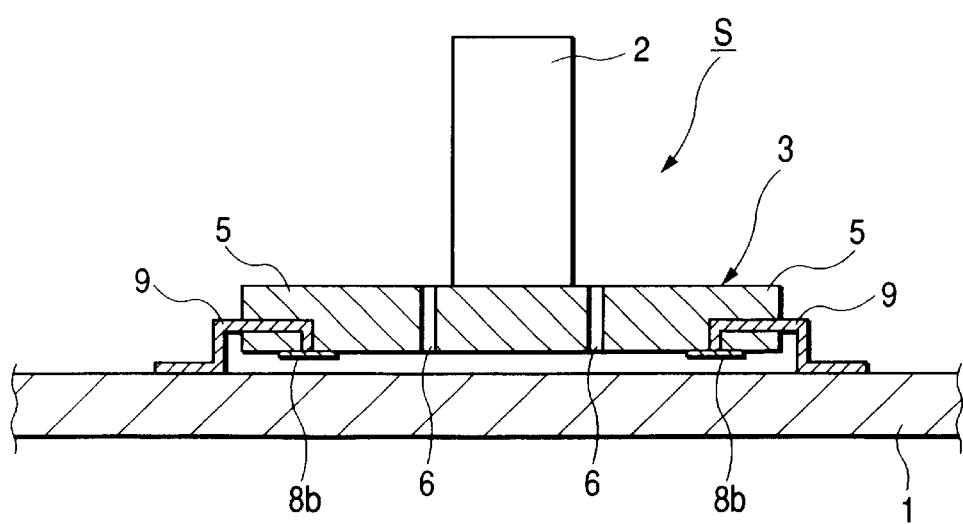
FIG. 2 is a cross-sectional view taken along line 2—2 of FIG. 1.
Figure 3:
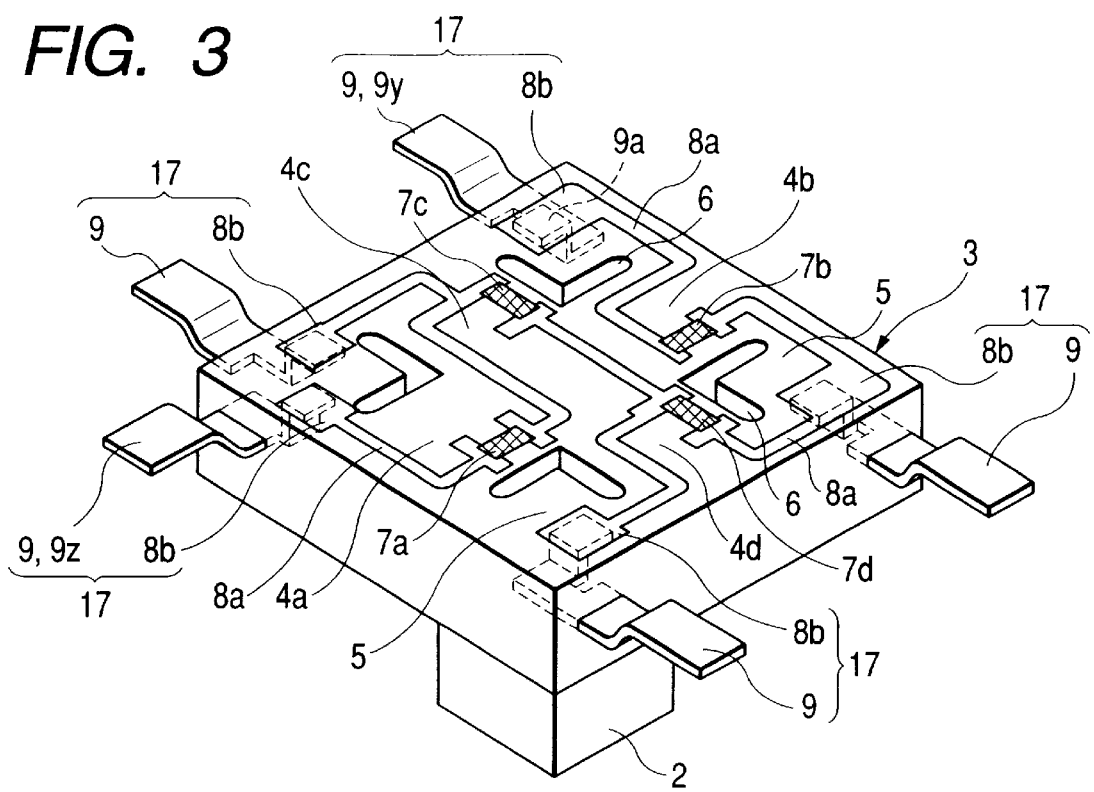
FIG. 3 is a perspective view when the input device of the first embodiment of the present invention is reversed.
Figure 4:
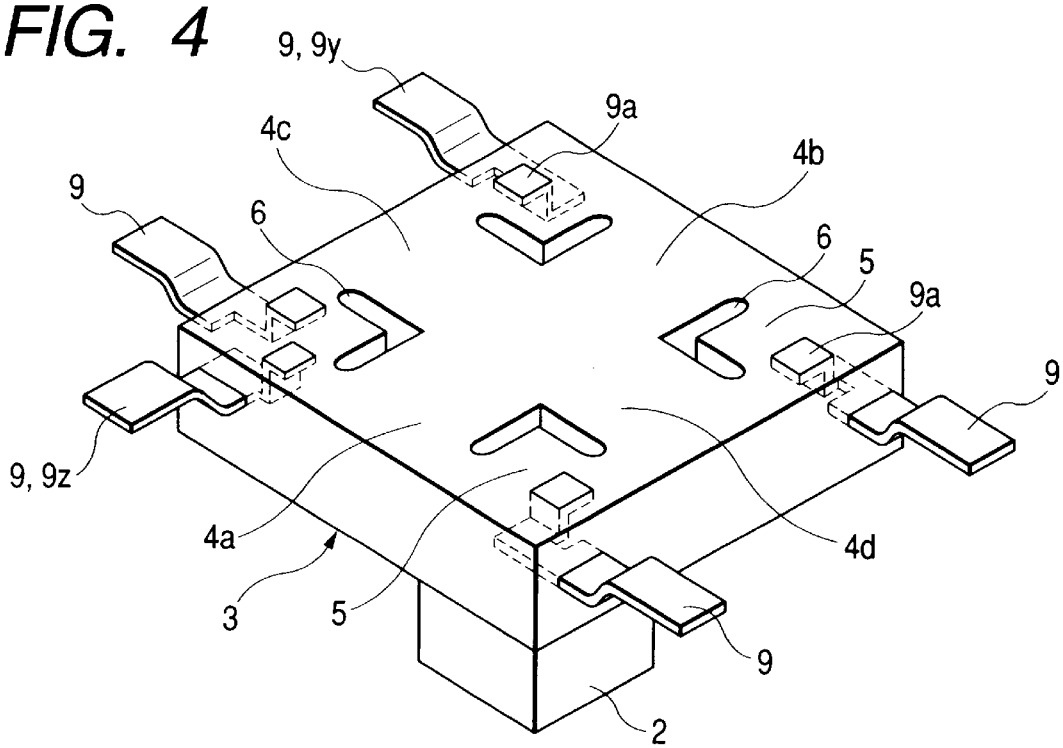
FIG. 4 is a perspective view according to the input device of the first embodiment of the present invention showing a state where terminals are embedded in a base portion.

The drawings of a first embodiment of the input device according to the present invention will be described. FIGS. 1 to 4 all relates to the input device of the present invention, in which FIG. 1 is a plan view showing a state where the input device of the present invention is mounted on a print circuit, FIG. 2 is a cross-sectional view taken along line 2—2 of FIG. 1, FIG. 3 is a perspective view showing a state where the input device of the present invention is reversed, and FIG. 4 is a perspective view according to the input device of the present invention showing a state where terminals are embedded in a base portion.

The construction of the first embodiment of the input device using deflection detecting elements according to the present invention will be described with reference to FIGS. 1 to 4. A print board 1 for use in a keyboard is provided on its top face with a wiring pattern 1a and a plurality of land portions 1b connected to the wiring pattern 1a.

An operation member S made of a molding product such as synthetic resin and having flexibility consists of an operation portion 2 in a prism or cylindrical bar or tube shape, and a planar substrate portion 3 provided in its center portion with the operation portion 2.

The operation portion 2 and the substrate portion 3 may be manufactured by being divided into two, and the operation portion 2 may be mounted in the center portion of the substrate portion 3.

The substrate portion 3 is square-shaped and has a plurality of beam portions 4a, 4b, 4c and 4d extending from the operation portion 2 at a 90° angle to each other in a cross shape, a coupling portion 5 coupled to each of the other adjacent ends of the beam portions 4a, 4b, 4c and 4d, and V-shaped holes 6 in the position opposite to the corner of the operation portion 2 for separating the beam portions 4a, 4b, 4c and 4d at the location surrounded by the adjacent beam portions 4a, 4b, 4c and 4d and the coupling portion 5.

The operation portion 2 can be tilted in the directions of arrow X1 or X2 and Y1 or Y2, as shown in FIG. 1. Based on the tilting, the beam portions 4a, 4b, 4c and 4d of the substrate portion 3 are deflected and the lower face side thereof is extended or shrunk. Further, due to the presence of the holes 6 provided between the beam portions 4a, 4b, 4c and 4d, when the operation portion 2 is tilted, the adjacent beam portions are prevented from being affected each other, and the respective beam portions can be deflected.

As shown in FIG. 3, the substrate portion 3 is provided in its lower face with four rectangular deflection detecting elements 7a, 7b, 7c and 7d disposed in the circumference direction at a 90° angle to each other and formed of a thick film resistor, a conductor 8a made of silver paste for joining the deflection detecting elements 7a, 7b, 7c and 7d, and a plurality (five) of electrode portions 8b of silver paste disposed at one end of the conductor 8a and formed between the deflection detecting elements 7a, 7b, 7c and 7d.

In the abovementioned embodiment, the input device using four deflection detecting elements 7a, 7b, 7c and 7d is described. The input device, however, may use two deflection detecting elements 7a, 7c.

Such deflection detecting elements 7a, 7b, 7c and 7d are positioned on the lower faces of the beam portions 4a, 4b, 4c and 4d, respectively, and the electrode portions 8b are positioned on the lower face of the coupling portion 5.

Here, though not shown, the substrate portion 3 is provided on its lower face with a resist film made of an insulating material so as to protect the deflection detecting elements 7a, 7b, 7c and 7d, the conductor 8a and the electrode portions 8b.

A plurality of terminals 9 made of a metal material such as metal plate are embedded in the substrate portion 3, respectively, in particular, as shown in FIGS. 3 and 4. The portion constructed by the electrode portion 8b and the terminal 9 will be hereinafter referred to as a terminal portion 17. End portions 9a on one side of the terminals 9 are exposed from the lower face of the substrate portion 3 to be conducted with the electrode portions 8, respectively. End portions on the other side protrude from the side face of the substrate portion 3 and are positioned downwardly from the lower face for protrusion.

Since terminals 9y and 9z of the five terminals 9 are hard to be routed on the back face of the substrate portion 3, the terminals 9y and 9z are not connected here. When the input device is mounted on the print board 1, the terminals 9y,9z are connected (not shown).

The terminals 9 may be connected to the deflection detecting elements 7a, 7b, 7c and 7d. Further, the terminals 9 except for the terminals 9 disclosed in this embodiment may employ various shapes and embedding positions.

In the input device having such a construction, while the terminals 9 are mounted on the land portions 1b of the print board 1, respectively, the terminals 9 are soldered thereto. Then, the input device is surface-mounted on the print board 1.

When the input device is soldered, the deflection detecting elements 7a, 7b, 7c and 7d are connected via the terminals 9 to the wiring pattern 1a. As shown in FIG. 2, the terminals 9 form a space (gap) between the lower face of the substrate portion 3 and the print board 1, so that the beam portions 4a, 4b, 4c and 4d are easy to deflect.

Next, the operation of such an input device will be described. When the operation portion 2 is tilted in the X1 direction, the lower face of the beam portion 4a is deflected in the shrinking direction, and the lower face of the beam portion 4b is deflected in the extending direction. Thus, the resistance value of the deflection detecting element 7a of the lower face of the beam portion 4a is decreased, and the resistance value of the deflection detecting element 7b of the lower face of the beam portion 4b is increased. On the contrary, when the operation portion 2 is tilted in the X2 direction, the lower face of the beam portion 4a is deflected in the extending direction, and the lower face of the beam 4 portion 4b is deflected in the shrinking direction. Thus, the resistance value of the deflection detecting element 7a of the lower face of the beam portion 4a is increased, and the resistance value of the deflection detecting element 7b of the lower face of the beam portion 4b is decreased. In this way, a difference in voltage is caused between the deflection detecting elements 7a and 7b so as to move the cursor in the X-axis direction.

When the operation portion 2 is tilted in the Y1 direction, the lower face of the beam portion 4c is deflected in the shrinking direction, and the lower face of the beam portion 4d is deflected in the extending direction. Thus, the resistance value of the deflection detecting element 7c of the lower face of the beam portion 4c is decreased, and the resistance value of the deflection detecting element 7d of the lower face of the beam portion 4d is increased. On the contrary, when the operation portion 2 is tilted in the Y2 direction, the lower face of the beam portion 4c is deflected in the extending direction, and the lower face of the beam portion 4d is deflected in the shrinking direction. Thus, the resistance value of the deflection detecting element 7c of the lower face of the beam portion 4c is increased, and the resistance value of the deflection detecting element 7d of the lower face of the beam portion 4d is decreased. In this way, a difference in voltage is caused between the deflection detecting elements 7c and 7d so as to move the cursor in the Y-axis direction.

Figure 5:
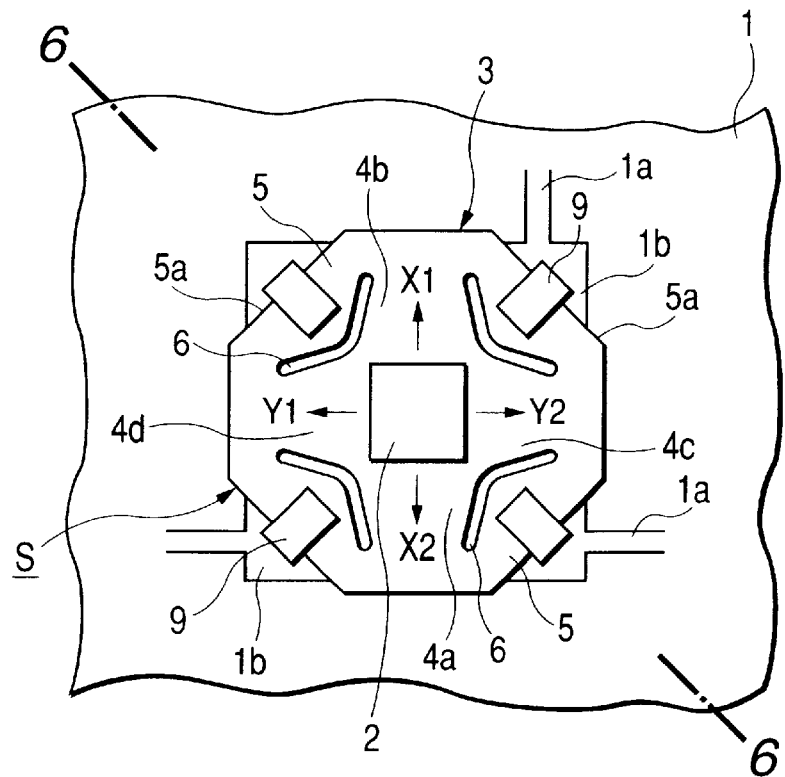
FIG. 5 is a plan view of a second embodiment of the input device of the present invention.
Figure 6:
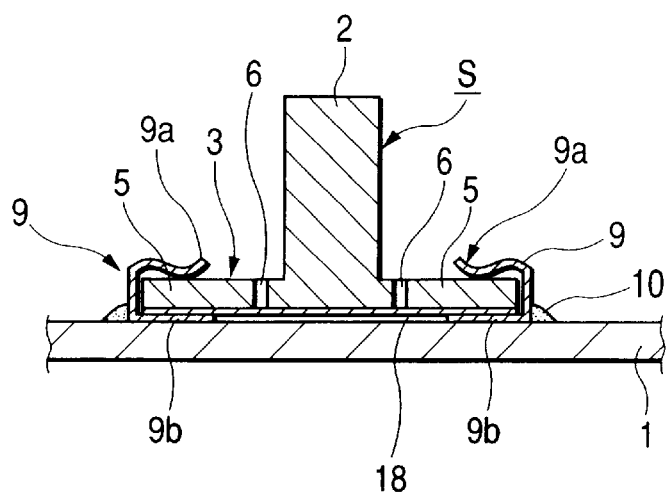
FIG. 6 is a cross-sectional view taken along line 2—2 of FIG. 5.
Figure 7:
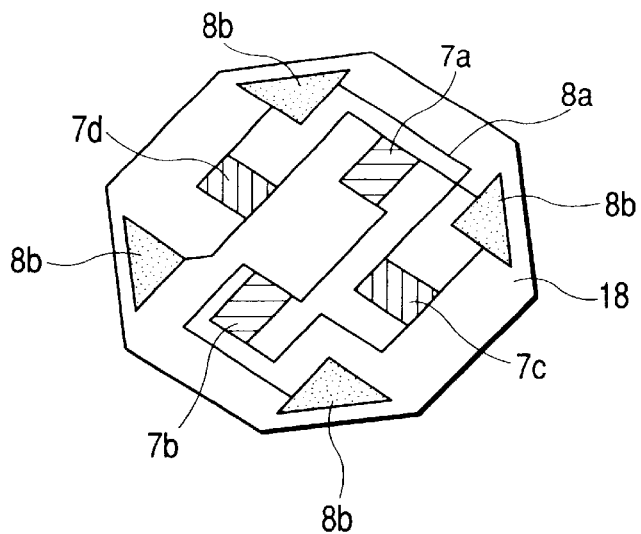
FIG. 7 is a perspective view according to the second embodiment of the input device of the present invention when a flexible substrate is reversed.
Figure 8:
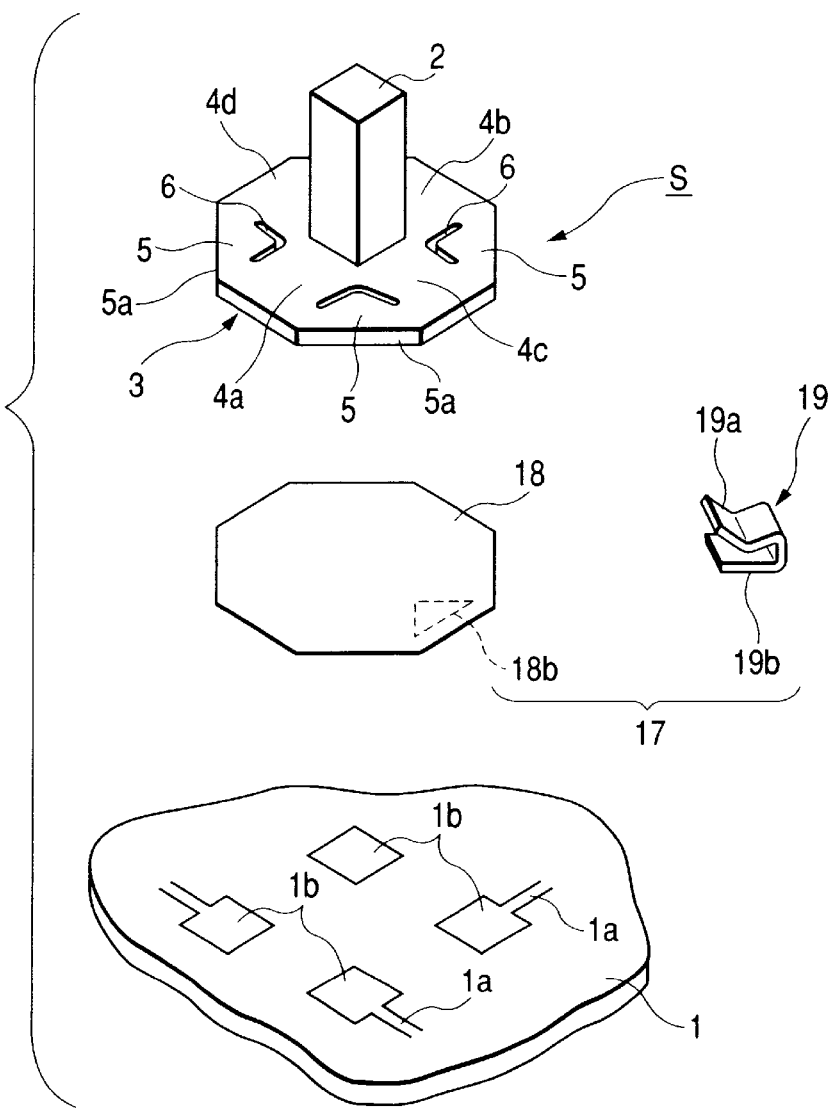
FIG. 8 is an exploded perspective view of the second embodiment of the input device of the present invention.

The drawings of a second embodiment of the input device according to the present invention will be described. FIGS. 5 to 8 all relates to the input device of the second embodiment of the present invention, in which FIG. 5 is a plan view of the second embodiment of the input device of the present invention, FIG. 6 is a cross-sectional view taken along line 2—2 of FIG. 5, FIG. 7 is a perspective view according to the second embodiment of the input device of the present invention when a flexible substrate is reversed, and FIG. 8 is an exploded perspective view of the second embodiment of the input device of the present invention.

The second embodiment of the input device having deflection detecting elements according to the present invention will be described with reference to FIGS. 5 to 8. Common parts and members are denoted by like numerals, and the description thereof will be omitted.

The base portion 3 has an outside shape different from that of the first embodiment and is octagonal-shaped, but has the same function. Further, the beam portions 4a, 4b, 4c and 4d are similar to those of the first embodiment. The coupling portion 5 positioned between the beam portions 4a, 4b, 4c and 4d has linear portions 5a formed by cutting off the parts thereof in the positions opposite to each other with respect to the center of the operation portion. The operation portion 2 also has the same function and shape as those of the first embodiment, and the description thereof will be omitted.

The flexible substrate as a member specific for the second embodiment will be described.

A flexible substrate 18 made of an insulating plate is octagonal which is the same shape as the outside shape of the substrate portion 3 of the operation member S. The size of the flexible substrate 18 is approximately equal to or made slightly smaller than the outside shape of the substrate portion 3.

As shown in FIG. 7, the flexible substrate 18 is provided at one face side as its lower face with four rectangular deflection detecting elements 7a, 7b, 7c and 7d disposed in the circumference direction at a 90° angle to each other and formed of a thick film resistor, a conductor 8a made of silver paste or copper foil for joining the deflection detecting elements 7a, 7b, 7c and 7d, and a plurality (four) of electrode portions 8bof silver paste disposed at one end of the conductor 8a and formed between the deflection detecting elements 7a, 7b, 7c and 7d.

In such a flexible substrate 18, the other face side as its top face is adhered onto the lower face of the substrate portion 3 using a bonding agent. When the flexible substrate 18 is mounted, the deflection detecting elements 7a, 7b, 7c and 7d are positioned on the lower faces of the beam portions 4a, 4b, 4c and 4d, respectively, and the electrode portions 8b are positioned on the lower face of the coupling portion 5. As a result, the linear portions 5a provided on the coupling portion 5 are positioned between the deflection detecting elements 7a, 7b, 7c and 7d.

A plurality of U-shaped clips 19 made of a metal material each have an upper piece portion 19a bent in a V shape, and a linear lower piece portion 19b. These clips 19 are respectively mounted in the positions of the linear portions 5a of the coupling portion 5 so as to grip the substrate portion 3 and the flexible substrate 18.

When these clips 19 are mounted, the lower piece portions 19b are in contact with the electrode portions 8b, respectively.

In this embodiment, a combination of the electrode portion 8b and the clip 19 is referred to as the terminal portion 17.

The clip 19 is positioned such that there are provided two protrusive streaks disposed at intervals over the top face of the coupling portion 5 and the surface of the linear portion 5a, and the clip 19 is fitted between the protrusive streaks as a guide. Thus, mounting of the clip 19 is more constant, and the clip 19 can be reliably contacted with the electrode portion 8b.

In the input device having such a construction, while the lower piece portions 19 of the clips 19 are mounted on the land portions 1b of the print board 1, respectively, the lower piece portions 19 are soldered 10 thereto. Then, the input device is mounted on the print board 1.

When the input device is soldered 10, the land portions 1b, the lower piece portions 19b and the electrode portions 8b are soldered 10 at the same time, and the deflection detecting elements 7a, 7b, 7c and 7d are connected to the wiring pattern 1a. The lower piece portions 19b of the clips 19 form a gap between the flexible substrate portion 18 and the print board 1, so that the beam portions 4a, 4b, 4c and 4d are easy to deflect.

The operation of such an input device is similar to that of the first embodiment, and the description thereof will be omitted.

Figure 9:
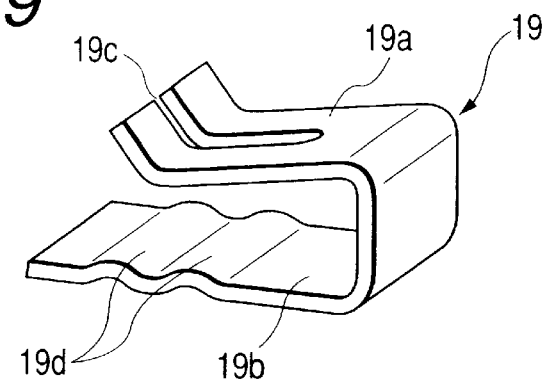
FIG. 9 is a perspective view of a clip according to a third embodiment of the input device of the present invention.
Figure 10:
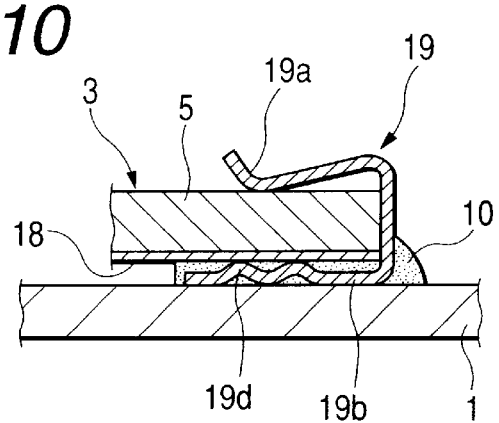
FIG. 10 is a cross-sectional view of an essential part according to the third embodiment of the input device of the present invention.

A third embodiment of the input device according to the present invention is shown in FIGS. 9 and 10. In this embodiment, the upper piece portion 19a of the clip 19 is formed with a cutting groove 19c, and the lower piece portion 19b is provided with a plurality of convex portions 19d consisting of protrusive streaks in the direction across the width direction.

When the clip 19 is mounted, the top portion of the convex portions 19d comes into contact with the electrode portion 8b, so as to make better contact of the clip 19 with the electrode portion 8b. In addition, a gap is provided between the land portion 1b and the lower piece portion 19b, and between the lower piece portion 19b and the electrode portion 8b. When soldering 10 is done by the gap, the soldering 10 is interposed between the land portion 1b and the lower piece portion 19b, and between the lower piece portion 19b and the electrode portion 8b, so that the soldering 10 between the land portion 1b and the lower piece portion 19b, and between the lower piece portion 19b and the electrode portion 8b can be better and reliable.

Since other construction is similar to that of the first embodiment, like parts are denoted by like numerals, and the description thereof will be omitted.

Figure 11:
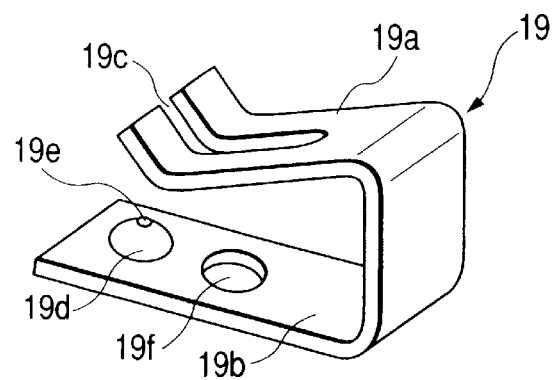
FIG. 11 is a perspective view of a clip according to a fourth embodiment of the input device of the present invention.
Figure 12:
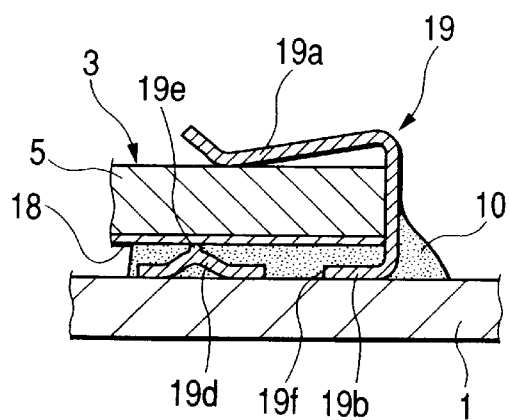
FIG. 12 is a cross-sectional view of an essential part according to the fourth embodiment of the input device of the present invention.
Figure 13:
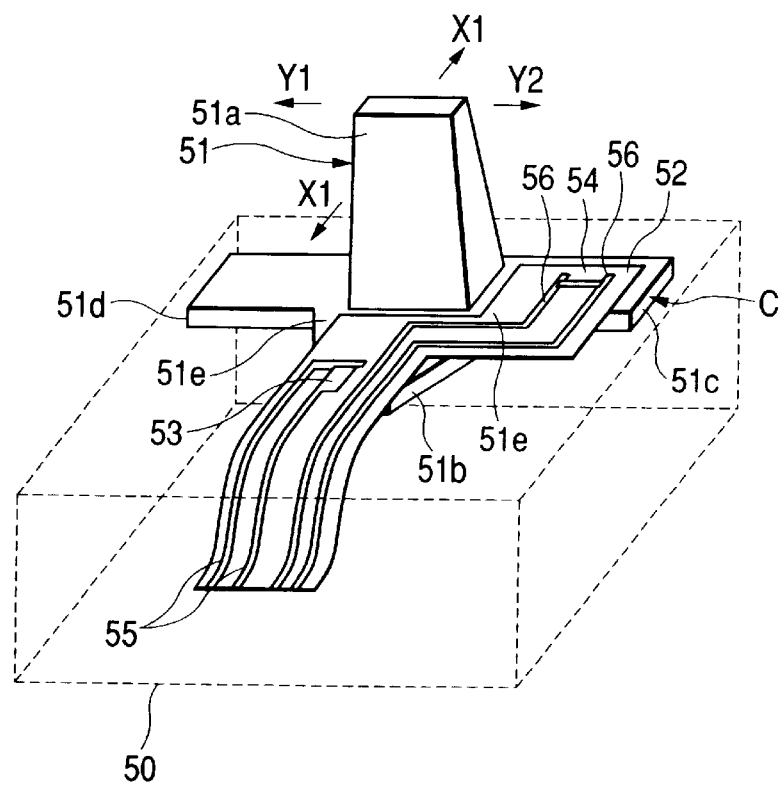
FIG. 13 is a perspective view of a conventional input device.

FIGS. 11 and 12 show a fourth embodiment of the input device according to the present invention. In this embodiment, the upper piece portion 19a of the clip 19 is formed with the cutting groove 19c, and the lower piece portion 19b is provided with the convex portion 19d having in its top portion a small projection 19e and a hole 19f.

When the clip 19 is mounted, the small projection 19e in the top portion of the convex portion 19d comes into contact with the electrode portion 8b, so as to make better contact of the clip 19 with the electrode portion 8b. In soldering 10, the soldering 10 is inserted in the hole 19f, so that the soldering 10 between the land portion 1b and the lower piece portion 19b, and between the lower piece portion 19b and the electrode portion 8b can be better and reliable.

Since other construction is similar to that of the second embodiment, like parts are denoted by like numerals, and the description thereof will be omitted.

In the abovementioned embodiment, the input device using the clip 19 is described. Alternatively, instead of the clip 19, the electrode portion 8b may be soldered 10 directly to the land portion 1b.

In the input device of the first embodiment according to the present invention, a plurality of the terminals 9 of a metal material connected to the deflection detecting elements 7a,7c are embedded in the substrate portion 3 of the operation member S. The terminal 9 allows the input device to be surface-mounted on the print board 1. It is thus possible to the input device which is inexpensive without using the conventional flexible substrate, and is small without employing a flexible substrate larger than the substrate portion 3.

Since the present invention has the abovementioned construction, the conventional large flexible substrate must not be mounted on the operation member, and the operation member must not be mounted on the frame. The terminals 9 may simply be soldered to the print board 1. It is thus possible to provide the input device which can reduce the number of assembling processes, has good productivity, and is inexpensive.

The four deflection detecting elements 7a, 7b, 7c and 7d are disposed at a 90° angle to each other with respect to the operation portion 2 as its center. It is thus possible to provide the input device which has good accuracy, as compared with the conventional input device using two deflection detecting elements.

The terminals 9 protrude downwardly from the lower face of the substrate portion 3, and the terminals 9 allow the lower face of the substrate portion 3 to be mounted on the print board 1 so as to be spaced therefrom. The space permits the substrate portion 3 to be deflected easily. It is thus possible to provide the input device which has good deflection of the deflection detecting elements.

The substrate portion 3 is provided in its lower face with a plurality of the electrode portions 8b connected to the deflection detecting elements 7a, 7b, 7c and 7d, and the electrode portions 8b are conducted with the terminals 9. It is thus possible to provide the input device which makes its contact good, and has flexibility capable of changing the position of the electrode portion 8b according to the position of the terminal 9.

The electrode portion 8b is formed between the adjacent deflection detecting elements 7a, 7b, 7c and 7d. It is thus possible to provide the input device which has a good space factor and is small.

The substrate portion 3 is formed with the beam portions 4a, 4b, 4c and 4d by providing the positions between the deflection detecting elements 7a, 7b, 7c and 7d with the holes 6, respectively, and the deflection detecting elements 7a, 7b, 7c and 7d are disposed in the beam portions 4a, 4b, 4c and 4d, respectively. When the operation portion 2 is tilted in the X1 or X2 direction, the beam portions 4c,4d are not affected, and the operation portion 2 is tilted in the Y1 or Y2 direction, the beam portions 4a,4b are not affected. It is thus possible to provide the input device which can change the resistance value only of the deflection detecting element to be varied, and has good accuracy.

In the input device of the second, third and fourth embodiments according to the present invention, the other face side of the flexible substrate 18 is adhered onto the lower face of the substrate portion 3, and the electrode portions 8b provided on one face side of the flexible substrate 18 are soldered to the land portions of the print board 1. The input device may be assembled by adhesion of the flexible substrate 18 onto the substrate portion 3 and soldering of the electrode portions 8b to the land portions 1b. It is thus possible to provide the input device which can reduce the number of assembling processes as compared with the conventional input device, has good productivity, and is inexpensive.

The electrode portions 8b are soldered to the land portions 1b so that the input device can be mounted and at the same time, the deflection detecting elements can be connected to the wiring pattern 1a. The operation thereof is extremely easy.

The flexible substrate 18 is made substantially equal to or smaller than the outside shape of the substrate portion 3. It is thus possible to provide the input device which has the flexible substrate 18 smaller than that of the conventional input device, is small, and inexpensive.

The U-shaped clips 19 are provided. The clip 19 grips the substrate portion 3 and the flexible substrate 18. The lower piece portion 19b of the clip 19 is disposed on the print board 1 to form a gap between the flexible substrate 18 and the print board 1. The gap allows the substrate portion 3 to be deflected easily. The clip 19 can prevent delamination of the flexible substrate 18 adhered.

The clip 19 is formed of a metal material, the lower piece portion 19b is contacted with the electrode portion 8b, the lower piece portion 19b is soldered to the land portion 1b together with the electrode portion 8b. It is thus possible to provide the input device which makes soldering 10 reliable and ensures mounting strength and electrical connection.

The lower piece portion 19b of the clip 19 is provided with the hole 19f in the position in which the electrode portion 8b and the land portion 1b are opposite to each other. The soldering 10 is inserted in the holes 19f, the soldering 10 between the land portion 1b and the lower piece portion 19b, and between the lower piece portion 19b and the electrode portion 8b can be better and reliable.

The lower piece portion 19b of the clip 19 is provided with the convex portion 19d in the position in which the electrode portion 8b and the land portion 1b are opposite to each other. The soldering 10 is interposed between the land portion 1b and the lower piece portion 19b, and between the lower piece portion 19b and the electrode portion 8b. The soldering 10 between the land portion 1b and the lower piece portion 19b, and between the lower piece portion 19b and the electrode portion 8b can be better and reliable.

The top portion of the convex portion 19d comes into contact with the electrode portion 8b. Thus, the clip 19 makes better contact with the electrode portion 8b, thereby making conduction of both reliable.

The substrate portion 3 has linear portions 5a formed by cutting off the parts thereof in the positions opposite to each other with respect to the center of the operation portion 2 in the outer circumference portion positioned between the deflection detecting elements 7a, 7b, 7c and 7d, the clip being arranged in the position of the linear portion 5a. It is thus possible to provide the input device which can mount the clips 19 in a compact manner and is small.

What is claimed is:

1. An input device having deflection detecting elements comprising:
   an operation member having a planar substrate portion and an operation portion provided in the substantially center of the substrate portion;
   a plurality of deflection detecting elements provided on the lower face of the substrate portion; and
   a plurality of terminal portions consisting of a plurality of electrode portions connected electrically to the deflection detecting elements on the lower face of the substrate portion, and a plurality of terminals in contact with the electrode portions, wherein the plurality of terminals allow the input device to be surface-mounted on land portions of a print board.

2. The input device having deflection detecting elements according to claim 1, wherein four of the deflection detecting elements are disposed at a 90° angle to each other with respect to the operation portion as its center.

3. The input device having deflection detecting elements according to claim 1, wherein the portion with the terminal surface-mounted thereon protrudes downwardly from the lower face of the substrate portion, the terminal holding the lower face of the substrate portion so as to be spaced from the print board.

4. The input device having deflection detecting elements according to claim 1, wherein the terminal portion is formed between adjacent the deflection detecting elements.

5. The input device having deflection detecting elements according to claim 1, wherein a beam portion is formed in the substrate portion by providing a hole in the position surrounded by the adjacent deflection detecting elements and the terminal portion, the beam portion being provided with the deflection detecting element.

6. The input device having deflection detecting elements according to claim 1, wherein the terminal is held onto the substrate portion so that a part of the terminal is embedded therein.

7. The input device having deflection detecting elements according to claim 1, further comprising a flexible substrate provided at one face side with the deflection element and the electrode portion, the flexible substrate having the other face side adhered onto the lower face of the operation member.

8. The input device having deflection detecting elements according to claim 7, wherein the flexible substrate is made smaller than the outside shape of the operation member.

9. The input device having deflection detecting elements according to claim 8, wherein the terminal is a U-shaped clip, the clip gripping the operation member and the flexible substrate, and the clip having its lower piece portion arranged on the print board.

10. The input device having deflection detecting elements according to claim 9, wherein the lower piece portion of the clip is provided with a hole in the position in which the electrode portion and the land portion are opposite to each other.

11. The input device having deflection detecting elements according to claim 10, wherein the lower piece portion of the clip is provided with a convex portion in the position in which the electrode portion and the land portion are opposite to each other.

12. The input device having deflection detecting elements according to claim 11, wherein the top portion of the convex portion comes into contact with the electrode portion.

13. The input device having deflection detecting elements according to claim 9, wherein the operation member has linear portions formed by cutting off the parts thereof in the positions opposite to each other with respect to the center of the operation portion in the outer circumference portion positioned between the deflection detecting elements, the clip being arranged in the position of the linear portion.

* * * * *